United States Patent
Terlizzi et al.

(10) Patent No.: US 9,146,888 B2
(45) Date of Patent: Sep. 29, 2015

(54) TECHNIQUES FOR MONITORING CONTACTS IN A CONNECTOR

(71) Applicant: APPLE INC., Cupertino, CA (US)

(72) Inventors: Jeffrey J. Terlizzi, San Francisco, CA (US); Brian Menzel, Sunnyvale, CA (US); Jahan C. Minoo, San Jose, CA (US); Zachary C. Rich, San Jose, CA (US)

(73) Assignee: APPLE INC., Cupertino, CA (US)

( * ) Notice: Subject to any disclaimer, the term of this patent is extended or adjusted under 35 U.S.C. 154(b) by 83 days.

(21) Appl. No.: 13/935,339

(22) Filed: Jul. 3, 2013

(65) Prior Publication Data
US 2014/0013012 A1    Jan. 9, 2014

Related U.S. Application Data

(60) Provisional application No. 61/668,074, filed on Jul. 5, 2012.

(51) Int. Cl.
*G06F 3/00*    (2006.01)
*G06F 13/38*   (2006.01)
*H04L 12/26*   (2006.01)

(52) U.S. Cl.
CPC .............. *G06F 13/38* (2013.01); *G06F 13/385* (2013.01); *H04L 12/2602* (2013.01); *H04L 43/0817* (2013.01)

(58) Field of Classification Search
None
See application file for complete search history.

(56) References Cited

U.S. PATENT DOCUMENTS

| | | | | |
|---|---|---|---|---|
| 5,675,896 A * | 10/1997 | Aiyama et al. | | 30/216 |
| 5,689,242 A * | 11/1997 | Sims et al. | | 340/652 |
| 7,701,168 B2 * | 4/2010 | Thijssen | | 320/111 |
| 7,782,587 B2 * | 8/2010 | Anthony et al. | | 361/118 |
| 8,683,090 B2 | 3/2014 | Mullins et al. | | |
| 8,708,745 B2 | 4/2014 | Golko et al. | | |
| 2003/0211869 A1 * | 11/2003 | Lee | | 455/572 |
| 2009/0096413 A1 * | 4/2009 | Partovi et al. | | 320/108 |
| 2011/0221604 A1 * | 9/2011 | Johnson | | 340/664 |
| 2012/0106021 A1 * | 5/2012 | Suchoff | | 361/194 |
| 2012/0256585 A1 * | 10/2012 | Partovi et al. | | 320/108 |
| 2012/0303768 A1 * | 11/2012 | Fiennes | | 709/220 |
| 2013/0207594 A1 * | 8/2013 | Hung et al. | | 320/107 |
| 2013/0238823 A1 | 9/2013 | Terlizzi et al. | | |
| 2013/0244489 A1 | 9/2013 | Terlizzi et al. | | |
| 2013/0286522 A1 | 10/2013 | Mullins et al. | | |
| 2013/0305066 A1 | 11/2013 | Mullins et al. | | |
| 2013/0307467 A1 * | 11/2013 | Carletti | | 320/107 |

* cited by examiner

*Primary Examiner* — Henry Tsai
*Assistant Examiner* — Aurangzeb Hassan
(74) *Attorney, Agent, or Firm* — Kilpatrick Townsend & Stockton LLP

(57) ABSTRACT

Techniques for mounting contacts of a connector are provided. One technique involves actively and continuously monitoring contacts being used and the contacts not being used in a connector in order to determine potential dendrite growth and/or potential corrosion due to liquid intrusion or the like. Another technique includes lowering a bias voltage on a power contact and performing a system detect prior to enabling operational voltage/current on the contact.

21 Claims, 15 Drawing Sheets

| ID | VBus | Switch |
|----|------|--------|
| OFF | OFF | OPEN |
| OFF | ON | CLOSE |
| ON | OFF | OPEN |
| ON | ON | OPEN |

Fig. 13

TECHNIQUES FOR MONITORING CONTACTS IN A CONNECTOR

CROSS-REFERENCES TO RELATED APPLICATIONS

This application claims benefit under 35 USC §119(e) to U.S. Provisional Patent Application No. 61/668,074 filed Jul. 5, 2012 the disclosure of which is incorporated by reference in its entirety for all purposes.

BACKGROUND

Connectors are ubiquitous and are used in variety of applications for coupling two devices. Most connectors usually have some sort of contacts that facilitate transmission of signals between the devices connected using a connector. Conventionally, each contact in a connector has a specific pre-assigned function. In other words, each contact in a connector is designated to carry a certain type of signal, e.g., power, data, etc.

One of the conventional ways of minimizing interference between signals carried by the contacts of a connector included placing the power and the signal contacts such that there was enough distance between them to prevent any cross talk. Other conventional methods include optimizing the connector structure to prevent signal cross talk.

Another potential issue with connectors is corrosion/contamination and dendrite growth. Corrosion/contamination may be caused by liquid intrusion on to the contacts of the connector. Such liquid intrusion can cause arcing, contact corrosion, etc. that may lead to connector failure over a prolonged use. Connectors with exposed contacts are especially prone to damage caused by liquid intrusion and other corrosive elements.

Dendrites (e.g., Tin whiskers) are small metal hairs that grow from a metal pad that carries electric current. If there are two metal pads adjacent to each other, these dendrites can grow to create a short circuit between the two contacts. In connectors where the contacts are in close proximity to each other, this phenomenon can be more pronounced and may lead to premature failure of the connector.

SUMMARY

Embodiments of the present invention are generally related to connectors in electronic devices. More specifically, certain embodiments of the present invention are related to techniques for actively monitoring contacts in a connector to detect growth of dendrites and/or connector malfunction due to ingress of liquid or other foreign bodies.

Some embodiments of the present invention provide a method for actively and continuously monitoring contacts of a connector during operation. The connector is usually coupled to an electronic device such as a portable media device, an accessory, etc. The method includes monitoring some or all contacts within the connector continuously or periodically during its usage to determine whether dendrite growth is occurring and if so, the extent of the growth. The method may include monitoring voltage level on some or all the contacts and comparing the measured voltage level to an expected and/or threshold voltage level. As long as the measured voltage is equal to or close to the threshold voltage, the contacts can be deemed to be in satisfactory condition for operation. If not, a warning can be provided to the user of such devices that there is some issue that needs to be investigated. The issues may be faulty connector, temporary malfunction due to liquid or other foreign body intrusion, etc.

Other embodiment of the present invention provide techniques for lowering bias voltage on power contact(s) of a connector and using the lower bias/current to first ensure that another device is connected to the connector prior to turning on the full bias/current on the power contact(s). Lowering the bias voltage on the contact eliminates/slows down dendrite growth and also ensures that the voltage/current is provided only when really needed. This is especially useful when higher voltages are in use, e.g., 10-30 V chargers for portable media devices.

The following detailed description together with the accompanying drawings will provide a better understanding of the nature and advantages of the present invention.

BRIEF DESCRIPTION OF THE DRAWINGS

FIG. 13 illustrates a table showing the operation of the embodiment of FIG. 12.

DETAILED DESCRIPTION

Embodiments of present invention provide techniques for actively monitoring contacts of a connector. The technique includes continuously or periodically measuring a voltage difference between two a pair of adjacent contacts to determine whether the measured voltage is above or below a threshold. Based on the measured voltage, an alert can be generated to inform a user that the connector is unusable or that the connector needs to be visually inspected for corrosion/contamination.

Some embodiments of the present invention provide methods for lowering a bias voltage on a power contact of a connector such that the connector provides a low bias voltage for a host device detection and once it is determined that a host device is attached, the connector provides a higher voltage for charging or operating the host device.

Still other embodiments of the present invention provide an accessory that includes a connector. The accessory includes circuitry to measure voltage on the contacts of the connector, either continually or periodically, if the measured voltage is more than a threshold voltage, the accessory may present a warning to the user that the connector needs to inspect. In certain instances, the accessory may permanently "blacklist" itself if the problems with the connector persist after several warnings. This will help prevent damage to the host device, which is generally more expensive than the accessory.

Figure 1:
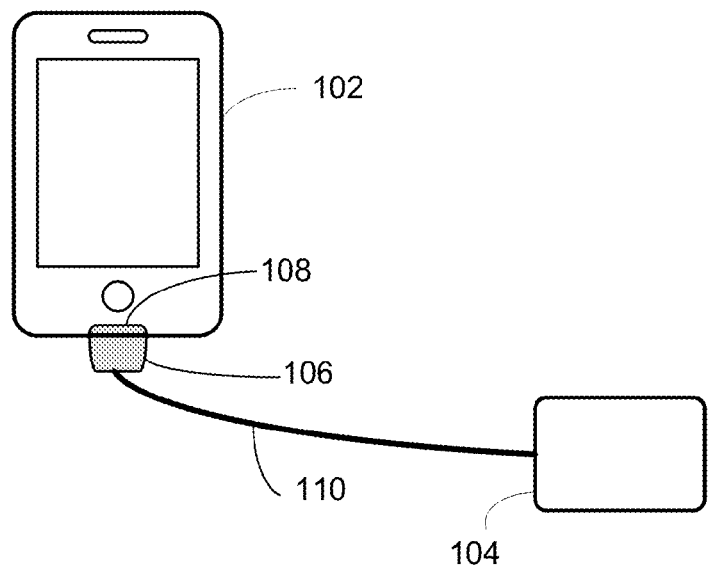
FIG. 1 is a block diagram illustrating components of a system according to an embodiment of the present invention.

FIG. 1 is a block diagram of a system 100 according to an embodiment of the present invention. System 100 includes a host device 102 and an accessory 104. In some embodiments, host device 102 may be connected directly to accessory 104 using complimentary connectors 106 and 108, respectively. In other embodiments, accessory 104 may be connected to host device 102 via an intermediate accessory, e.g., a cable, 110. For the purposes of this application, host device 102 can be any device that is capable of connecting with an accessory. Examples of host device 102 include but are not limited to a PC, a laptop computer, a portable electronic device, a tablet computer, a PDA, a mobile phone, etc. Examples of accessory 104 include but are not limited to a cable, a dongle, a camera, speakers, a stereo unit, a car head unit, a display, a projector, etc. In general, any device that can work with the host device can be considered an accessory.

Host device 102 includes a connector 106. Accessory 104 includes a connector 108. Connectors 106 and 108 are complimentary such that they can be physically mated with each other in order to connect host device 102 to accessory 104. The host device and the accessory can exchange data and power using the multiple contacts of the connectors. In some embodiments, each contact within the connectors 106 and 108 can be designated to carry a particular signal. In other embodiments, each contact of connectors 106 and 108 can be configurable to carry one of many available data signals and/or power signals. In some embodiments, connector 106 can be a receptacle connector and connector 108 can be a plug connector. In some embodiments, plug connector 108 can be mated with receptacle connector 106 in more than one orientation.

Figure 2:
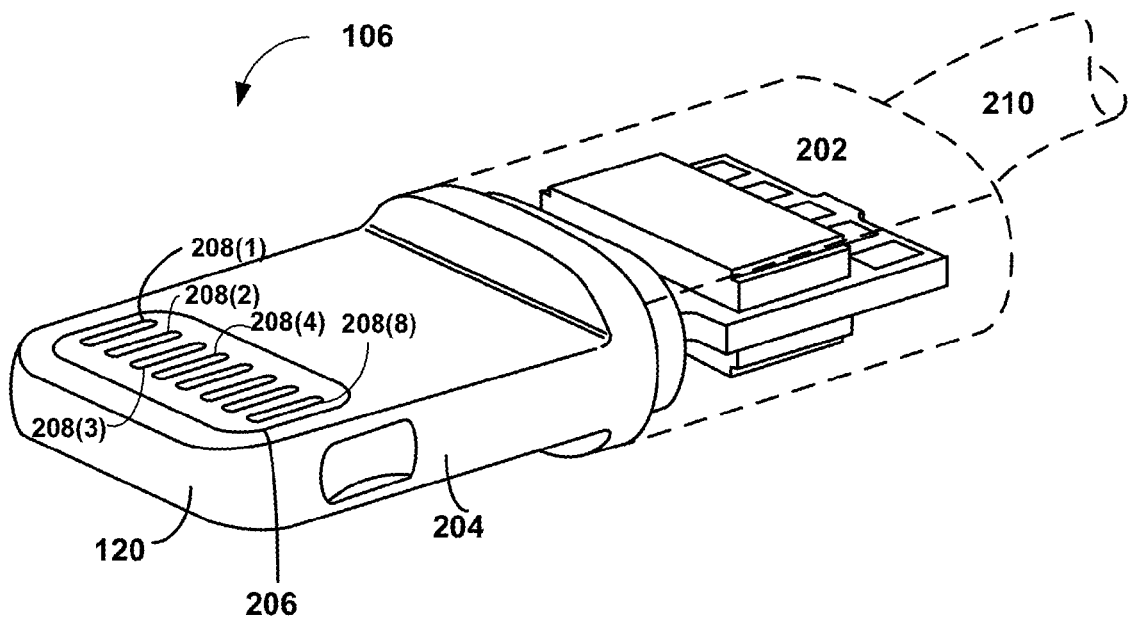
FIG. 2 is a schematic of a plug connector according to an embodiment of the present invention.

FIG. 2 is a schematic of a plug connector 106 according to an embodiment of the present invention. Plug connector 106 is exemplary and is used herein to explain the various embodiments of the present invention. One skilled in the art wilt realize that many other forms ad types of connectors other than plug connector 106 can be used and that techniques described herein will apply to any connector that has the characteristics of plug connector 106.

Plug connector 106 includes a body 202 and a tab portion 204. A cable may be attached to body 202. The cable may extend away from body 202 in a direction parallel to the length of the connector 106. Tab 204 is sized to mate with a corresponding receptacle connector. Tab 204 includes a contact region 206 formed on a first surface of tab 204. A plurality of contacts 208 are formed in the contact region 206. In some embodiments, contacts 208 are exposed when connector 106 is not mated with a corresponding receptacle connector. The number of contacts 208 may vary based on the type and function of connector 106. In some embodiments, the number of contacts 208 can be between 2 and 16. In some embodiments, contacts 208 are made from stainless steel and/or other alloys. Contacts 208 are designed to carry data and power signals.

In some embodiments, contacts 208 may be placed in close proximity to each other. FIG. 2 illustrates connector 106 with eight contacts for ease of explanation. However, one skilled in the art will realize that connector 106 may have more than eight contacts or less than eight contacts. As illustrated, contacts 208(1)-208(8) are arranged next to each other along a distal end of tab 204. In some embodiments, connector 106 may be disposed at the end of a cable 210 that is connected to an accessory, e.g., a charge/sync cable. In other embodiments, connector 106 may be integrated with an accessory, e.g., a keyboard dock. In some embodiments, each contact 208(1)-208(8) may early a specific signal. For example, contacts 208(1) and 208(2) may carry USB data signals and contact 208(3) may carry a power signal.

In some embodiments, connector 106 may be part of a power supply unit that provides charging current to a host device. In this configuration, one of the contacts, e.g., 208(3), may carry the voltage from the power supply unit to a host device connected to the power supply unit. In some embodiments, the voltage may be between 3 V and 30 V.

Figure 3:
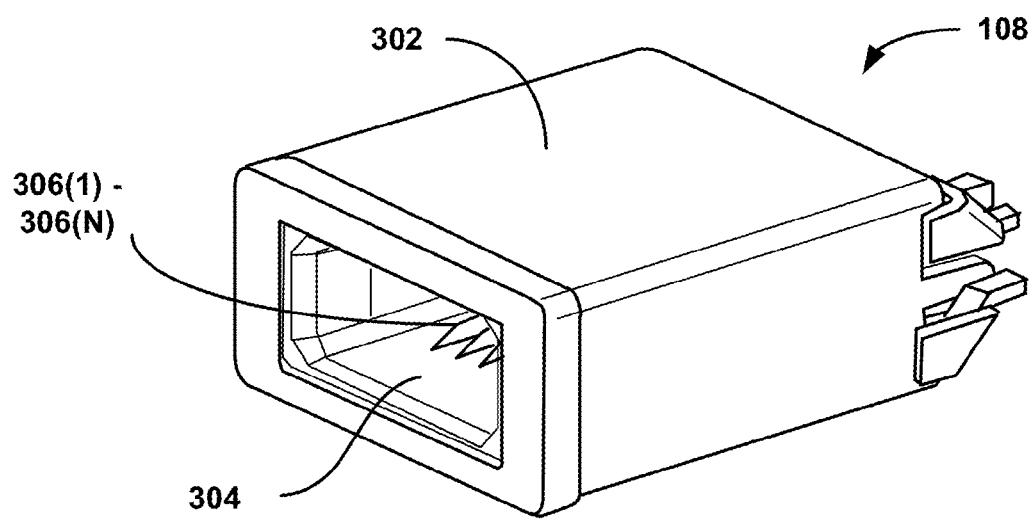
FIG. 3 is a schematic of a receptacle connector according to an embodiment of the present invention.

FIG. 3 is a schematic of a receptacle connector 108 according to an embodiment of the present invention. Receptacle connector 108 can be part of host device 102 and in some instances be integrated into host device 102. Receptacle connector 108 includes a housing 302 that defines a cavity 304 that houses contacts $306_{(1)}$-$306_{(N)}$ within the cavity. Each of the receptacle contacts $306_{(1)}$-$306_{(N)}$ electrically connects its respective plug contact to circuitry associated with the electrical device in which receptacle connector 108 is housed. In some embodiments, 'N' can be the same number as the contacts on plug connector 106.

As described above, presence of voltage on a contact increases the chances of dendrite formation. White there is little that can be done to completely prevent dendrite formation, there are techniques that can be implemented to monitor the dendrite growth and provide a proactive warning about an impending failure of the connector and in some instance slow down the formation of dendrites. The following embodiments describe some of the techniques that can be used to monitor dendrite growth and slow down or eliminate dendrite growth.

Figure 4:
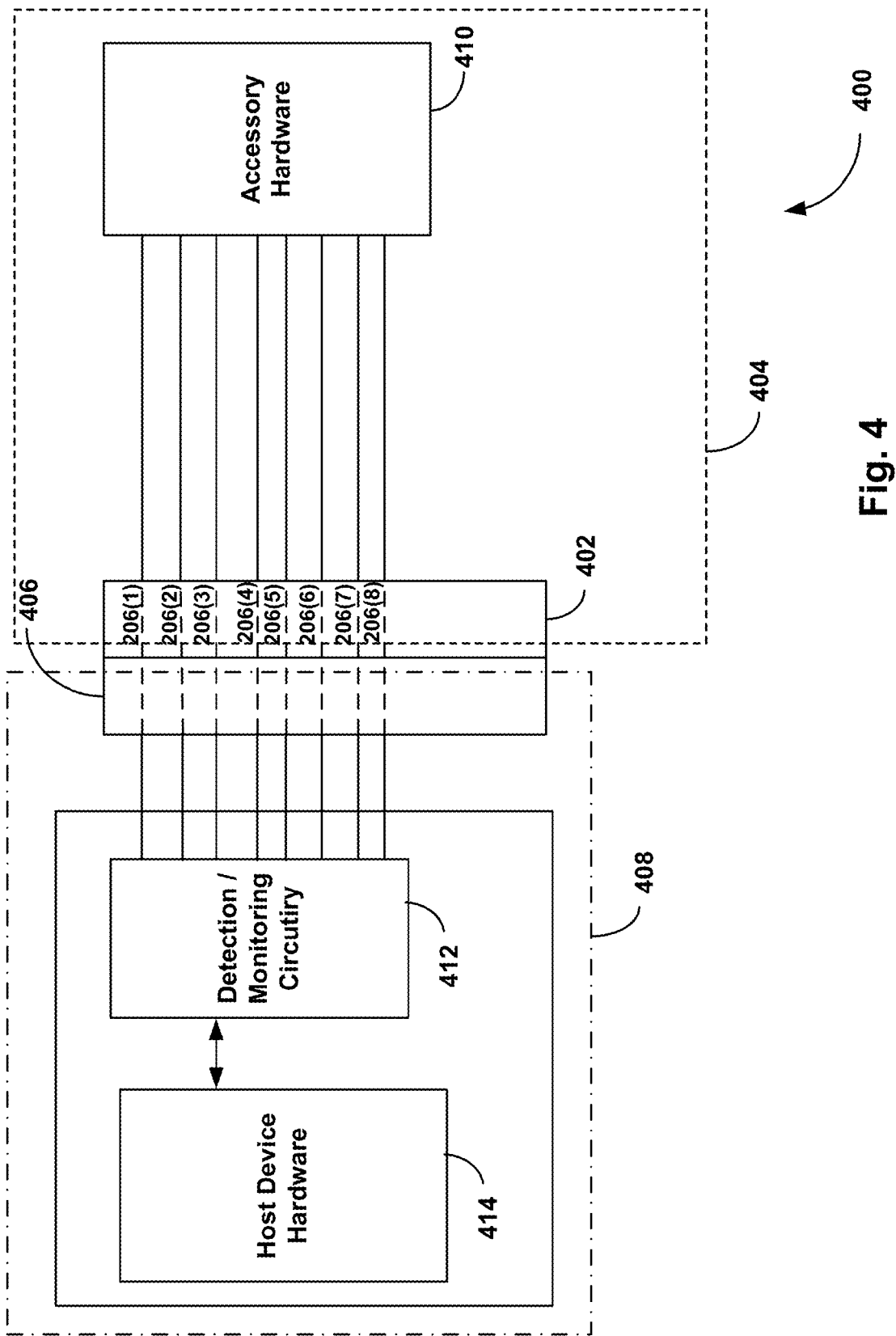
FIG. 4 is a functional block diagram of a system for monitoring dendrite growth according to an embodiment of the present invention.

FIG. 4 is a functional block diagram of a system 400 for monitoring dendrite growth according to an embodiment of the present invention. When a plug connector 402 of an accessory 404 is mated with its corresponding receptacle connector 406 of host device 408, the host device can authenticate the accessory prior to starting any data exchange with the accessory. Upon authentication, accessory 404 can supply power to host 408 via one of the contacts in plug connector 402. Plug connector 402 includes a plurality of contacts 410(1)-410(8). Contacts 410(4) and 410(5) carry power from accessory 404 to host device 408. Contacts 410(1), 410(2) and 410(6), 410(7) carry data between accessory 404 and host device 408. Host device 408 can include monitoring circuitry 412 that can monitor data contacts 410(2), 410(3) and 410(6), 410(7) to measure a voltage between them. For example, monitoring circuitry can measure a voltage between data contacts 410(2) and 410(3) and between data contacts 410(6) and 410(7).

Host device 408 can also include other host device hardware 414 such as one or more processors, memory, communication devices, various peripheral and graphics devices, etc. that enable operation of other aspects of host device 408. The description of host device hardware 414 is omitted here since it is not needed for understanding of the embodiments described herein.

In operation, either all or none of the data contacts may carry data based on the accessory type and application. In either instance, a voltage can be measured between the data contacts using monitoring circuitry 412. Monitoring circuitry 412 can be designed using conventional techniques to measure a voltage gradient between two contacts. As described above, accessory 404 may supply a voltage of between 3 V and 30 V on the power contacts.

Monitoring Data Contacts that are Currently being Used

Consider that data contacts 410(2) and 410(3) are being used to communicate USB data between accessory 404 and host device 408 and contacts 401(4) and 401(5) carry power from the accessory to the host device. Once the accessory starts supplying power to the host device, the presence of voltage on contacts 410(4) and 410(5) may trigger dendrite growth. In some embodiments, the dendrites may grow outwards from contacts 410(4) and 410(5) and towards contacts 410(3) and 410(6), respectively. In the worst case scenario, the dendrites may from an electrical path between contact 410(4) and contact 410(3), thus effectively shorting the data contact with the power contact. In this instance the connector may then be unusable and may have to be replaced. However, before the connector experiences such catastrophic failure, the data contacts 410(2) and 410(3) can be monitored to predict the extent of dendrite growth and shut down power on the power contacts in the event that failure is imminent.

As described above, contacts 410(2) and 410(3) may carry USB data. The USB protocol designates a certain voltage level for transmission of USB data. For example, the USB operates around 3.3 volts with the maximum being 5 V. Consider that the accessory is outputting 10 V on power contacts 410(4) and 410(5). During operation, the monitoring circuitry in host device 408 can monitor the voltage on data contacts 410(2) and 410(3) and compare that to the reference voltage of 3.3 V. As long as the measured voltage stays close to the reference voltage within a range of tolerance, it can be assumed that the dendrite growth is not significant so as to effect the operation of connector 402. If however, the measured voltage goes above the reference voltage and outside the tolerance limit, then it may be an indication that the dendrite growth is significant enough that a failure point is approaching. The monitoring can be done either continually or periodically whenever plug connector 402 is being used. For example, if the measured voltage is greater than 5 V, which is the maximum operating voltage of the USB standard, then it can be assumed that connector 402 has suffered a catastrophic failure. In this instance, host device 108 can send a message to accessory 406 to shut off the power on contacts 410(4) and 410(5) to prevent any damage to the accessory or the host device. In addition, a warning may be provided to the user about the failure and the user may be instructed to take the connector to a nearest service location for a thorough inspection.

In some embodiments, the host device may permanently mark the plug connector as being "unusable." Since every connector 402 has a unique identifier, the host device may tag the identifier of the connector and include the identifier in a quarantine list maintained by the host device. Thus, even if the same connector is plugged into the host device at a later time, the host device can receive the connector identifier during the authentication process (when there is no power being supplied via the connector) and compare that to the quarantine list. If a match is found, the host system may deny authentication to the accessory thus preventing damage to the host due to the unusable connector.

It is to be noted that USB was used above merely to illustrate operation according to one embodiment. Depending on the data protocol being used (e.g., UART, etc.) the reference voltage and tolerance levels may be different. However, the principle of operation remains the same.

Figure 5:
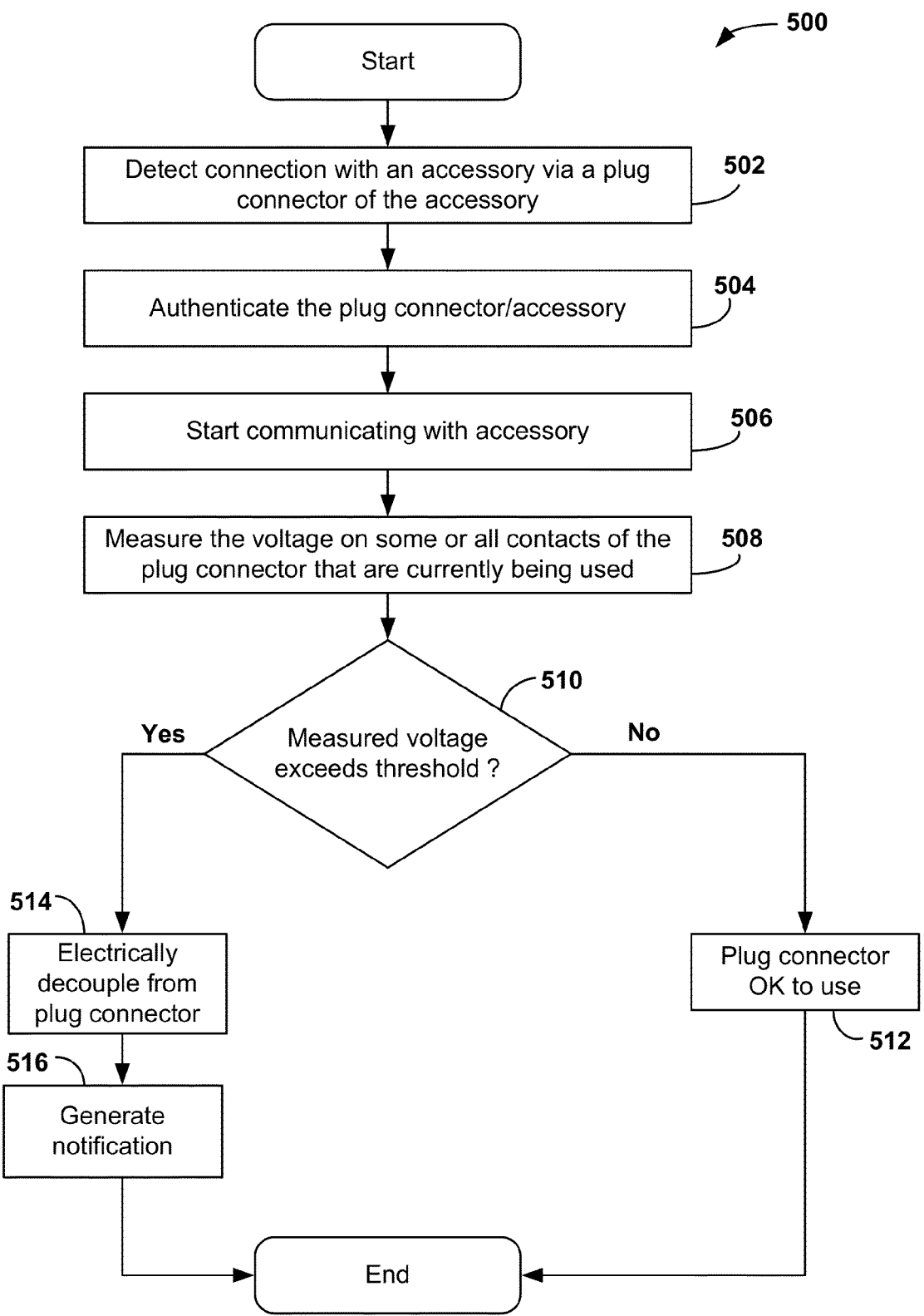
FIG. 5 is a flow diagram of a process for monitoring contacts in a connector according to an embodiment of the present invention.

FIG. 5 is a flow diagram of a process 500 for monitoring contacts in a connector according to an embodiment of the present invention. Process 500 may be performed, e.g., host device 102 of FIG. 1.

At block 502, the host device may detect mating of a plug connector with a receptacle connector of the host device. In some embodiments, the plug connector may be attached to an accessory such as a charging cable, a dock, etc. Upon detection, the host device may authenticate the connector/accessory at block 504. After authentication, the host device may start exchanging data/power with the accessory using the plug connector at block 506. At block 508, the host device may monitor voltage on some or all of the contacts that are currently carrying data/power. At block 510, the host may determine whether the measured voltage exceeds a threshold voltage for each of the contacts being currently used. If the measured voltage does not exceed the threshold voltage, the host can conclude that the contacts are in operation condition at block 512. Utile measured voltage on one or more of the contacts exceeds the threshold voltage, the host device may electrically decouple itself from the plug connector at block 514. In this instance, electrically decoupling means stopping all incoming/outgoing data/power signals via the plug connector and generally going in an idle state where there is no electrical communication between the host device and the plug connector. At block 516, the host device may generate a notification indicating that there is some issue with the plug connector.

It should be appreciated that the specific steps illustrated in FIG. 5 provides a particular method of monitoring contacts in a connector according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Monitoring Contacts that are not Currently being Used

For contacts that are not in use, similar techniques as above can be used to determine whether the dendrite growth is occurring and if yes, the impact of the dendrite growth. In one embodiment, analog-to-digital convertor circuitry in the host device can be used to monitor voltage on each of the unused contacts. In normal operation, if the contacts are not being used, there should be zero or some minimal voltage on the contacts. Thus, if the voltage measurement of the unused contacts reveals that there is none to minimal voltage on the contacts then it can be concluded that little or no dendrite growth is present and the contacts are in operational condition. However, if the voltage measurement indicates that the voltage on the unused contacts exceeds a certain threshold (e.g., 0.5 V) then the system may conclude that there is some issue with those contacts. The reasons for the high voltage may be due to dendrite growth, liquid or other type of intrusion causing a short, or just some type of wear/damage to the contact. In such an instance, before activating the unused contacts or sending data/power on the previously unused contacts, the system can generate an alarm indicative of this problem. The user may be prompted to visually inspect the connector contacts to ensure that there is no liquid/solid intrusion and/or corrosion.

If the contacts continue to exhibit higher voltage after several alarms, the host device may conclude that the particular connector is damaged and electrically decouple itself from the connector and send a notification that the connector is damaged and should be either replaced or repaired as the case might be. The advantage of doing this that it prevents any potential damage to the host device due a faulty connector on the accessory side. Also, it prevents connectors that are not manufactured according to the host device manufacturer's specification from being used with the host device in order to maintain overall system quality and integrity.

In some embodiments, when the plug connector is part of a power supply system, a short between a contact and the ground ring of the plug connector can be detected by monitoring the current being provided by the power supply and comparing that to a current being used by the host device. If those currents are not comparable within a tolerance margin, then it can be concluded that there is a potential shorting issue between a contact and ground and the host device may cease electrical connection with the power supply and generate an alarm to that effect. This can be helpful to detect shorts that may not be visually discernible. For example, consider that the power supply is providing 3 A of current output. However, the host device determines that it is receiving or using only 1 A current. In this instance, the extra 2 A of current is being dissipated somewhere within the host device. In this particular scenario, the host device may stop receiving current from the power supply and generate an alarm for the user to check the plug connector and make sure that there are no shorts in the plug connector. However, in the instance the current being used/received by the host device is 2.8 A, then it may be considered within a tolerance level. For example, the tolerance level may be 10% or less.

Techniques for Preventing/Slowing Down Dendrite Growth

As described above, presence of voltage on a contact of a connector is a feeding ground for dendrites. There are several ways to minimize the impact of the dendrites. As described above, individual contacts in a connector can be continuously monitored to determine if the dendrite growth has made the connector unusable or whether there is some sort of corrosion. Liquid intrusion, or the like that has degraded the performance of the connector. Some of these problems like liquid intrusion can be easily fixed by, e.g., cleaning the contacts of the connector. However, in the long run dendrites may be irreversible and cause permanent damage to the connector.

Thus, another way to ensure reliability and longevity of the connector is to implement techniques that can arrest/slow down the growth of the dendrites to an extent that they are not an issue over the life of the connector. The following description uses a power supply as the accessory connected to the host device for ease of explanation. However, it is to be understood that any accessory that can supply power to the host device is covered under this disclosure and the accessory should not be construed to be limited to a power supply.

Figure 6:
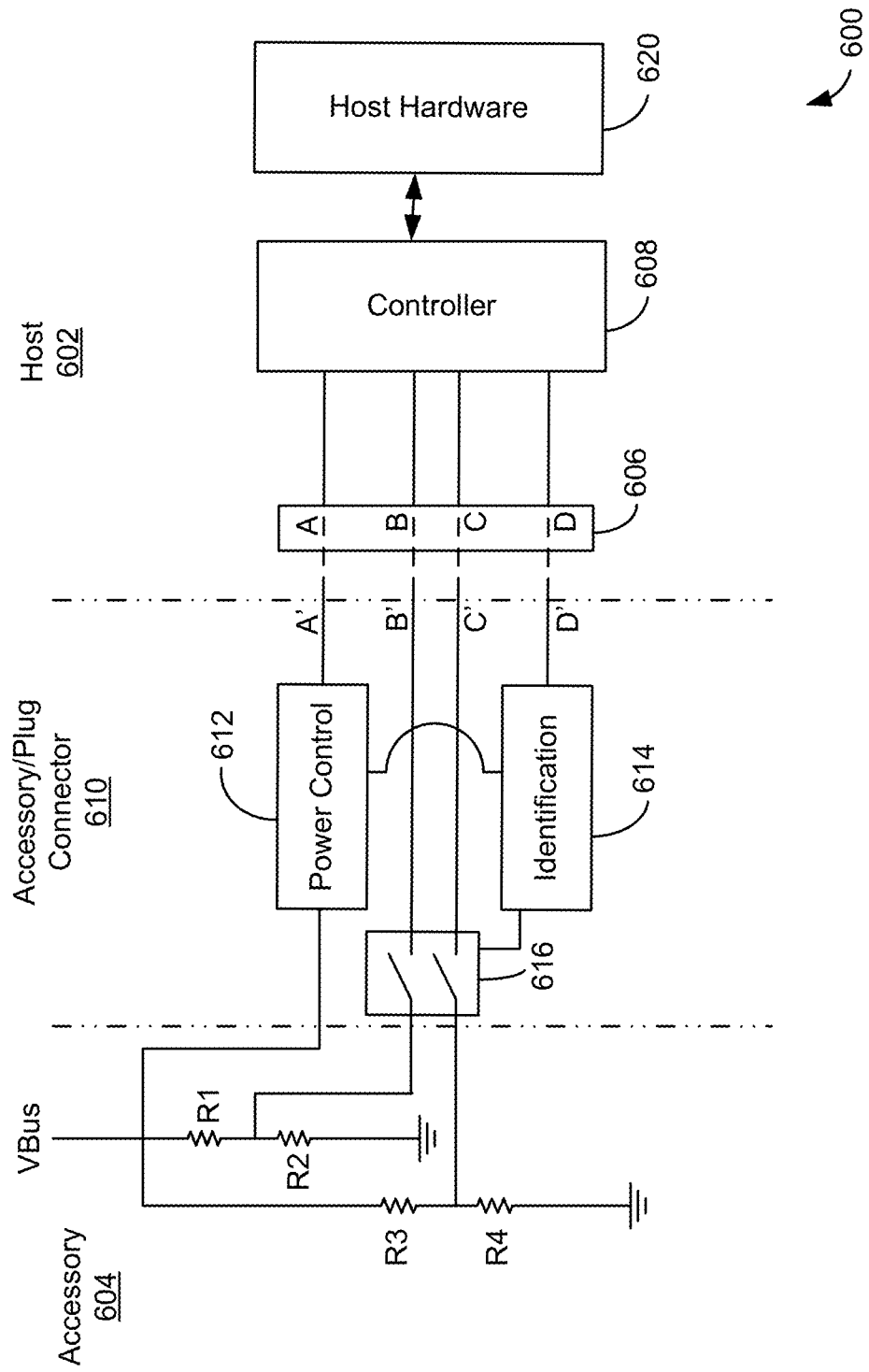
FIG. 6 is a block diagram for a system for monitoring contacts of a connector according to an embodiment of the present invention.

FIG. 6 is a block diagram for a system 600 for monitoring contacts of a connector according to an embodiment of the present invention. System 600 includes a host device 602 and an accessory 604. In this embodiment, accessory 604 is a power supply.

Host device 602 includes a receptacle connector 606 that has several contacts. Only a few of the contacts are illustrated here for ease of explanation. Receptacle connector 606 may have contacts A-D. Contacts A-D are electrically coupled to a controller 608 within host device 602. Contact A is the power contact through which accessory 604 can provide power to host device 602, e.g., for charging a battery in the host device. The charging voltage provided by accessory can range between 5 V and 30 V. Contacts B and C can be the data contacts over which data is exchanged between host device 602 and accessory 604. Contact D can be another data contact that may be used to communicate control/identification signals between host device 602 and accessory 604. Controller 608 is coupled to other host hardware components 620, which are not described herein.

Accessory 604 has a plug connector 610 that also has several contacts. Only contacts A'-D' are illustrated in FIG. 6 for ease of explanation. One skilled in the art will realize that pug connector 610 may have more or less than the number of contacts illustrated in FIG. 6. Contacts A'-D' correspond to contacts A-D of host device 602 and have similar functions. Accessory 604 also includes power control circuitry 612 disposed in-line with contact A'. Power control circuitry 612 has two modes. The first mode is a 'current limited' mode where power control circuitry 612 outputs a limited low value current, e.g., 15 mA max, over contact A'. In a second, 'current unlimited' mode power control circuitry outputs current up to a maximum of 5 A over contact A'. Power control circuitry 612 can be controlled by a signal from identification module 614.

Identification module 614 can store identification information of accessory 604 and communicate with host device 602 to identify and authenticate accessory 604. In operation, power control circuitry 612 may be in the current limited mode by default. When accessory 604 is identified and authenticated by host device 602, identification module 614 sends a signal to power control circuitry to enable the current unlimited mode and supply up to the maximum available current to host device 602. Host device 602 can the charge its battery or otherwise use the current for its operation.

Power control circuitry 614 receives an incoming voltage from other components within accessory 604. The description of those components is not needed in order to understand the embodiments described herein and such the description is omitted for brevity. In some embodiments, the incoming voltage on contact A' may be between 5 V and 30 V. Even though power control circuitry may be operating in the current limited mode, the presence of such high voltage on contact A' of plug connector 610 over an extended period of time is conducive to dendrite growth.

In order to prevent growth of dendrites on contacts A'-D', it is desirable to lower the bias voltage on contact A' until a host device is connected to accessory 604. As described above, having a high voltage on a contact increases the chances of dendrite growth particularly in an open-ended connection. In a particular embodiment of the present invention, the bias voltage on contact A' at system start up is lowered to about 0.3 V or lower until a host system connection is detected. Thus, power control circuitry 612 now has an additional mode where the output current is also voltage limited. For example, at system start-up contact A' may have a bias of 0.3 V and an output current of 15 mA or less.

In operation, when plug connector 610 is mated with receptacle connector 606, power control circuitry 612 is in the voltage limited current mode. For example, contact A' may provide a current of about 15 mA or less at about 0.3 V or less.

Thereafter, controller 608 can send an ID request command to identification module 614 via contacts D'-D. We refer to the electrical connection between controller 608 and identification module 612 herein as the 'ID bus line'. Before controller 608 can send the ID request command, the ID bus line, which is in a logic "low" state, is pulled up to a logic "high state." For example, the ID bus line may be at 0 V or some other low voltage and controller 608 may pull up the ID bus line to 3 V or some other higher voltage. Plug connector 606 (and the accessory) can detect this change of state/voltage on the ID bus line and send a signal to power control circuitry to enable the current limited mode but with the higher voltage (e.g., 15 mA or less at between 3-5 V). This can be referred to as a host device detect operation. In other words, the plug connector first detects presence of host device 602 before enabling the current limited mode for power control circuitry 610.

After the current limited mode is enabled, ID module 614 may communicate with controller 608 to authenticate accessory 604. Once the accessory is authenticated, the identification module may send another command to the power control circuitry to enable the current unlimited mode at the higher voltage. Accessory 604 can then exchange data/commands with host device 602.

Figure 7:
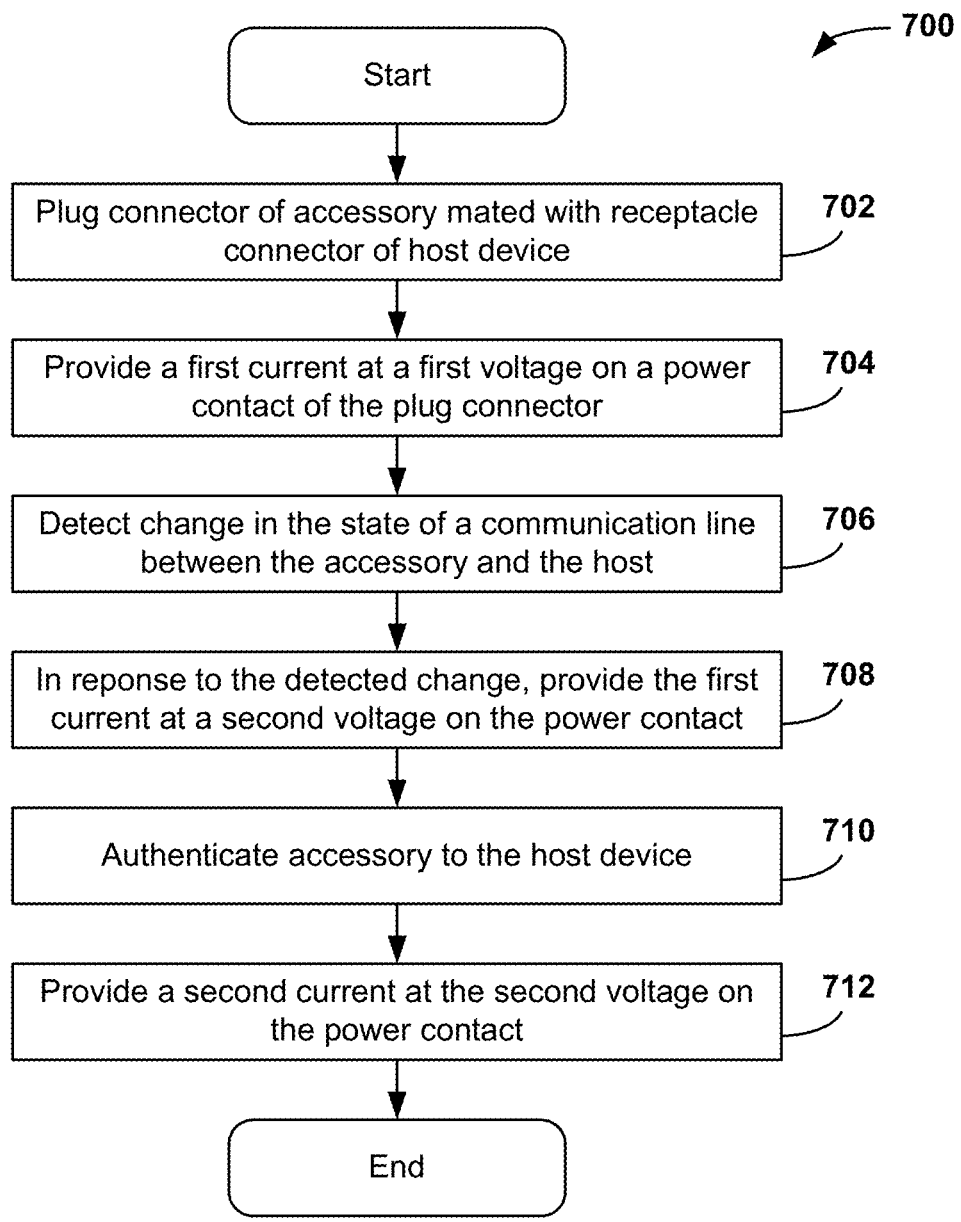
FIG. 7 is a flow diagram for a process for monitoring contacts of a connector according to another embodiment of the present invention.

FIG. 7 is a flow diagram for a process 700 for monitoring contacts of a connector according to an embodiment of the present invention. Process 700 can be performed by, e.g., accessory 604 of FIG. 6.

At block 702 a plug connector of the accessory is mated with a receptacle connector of a host device. At block 704, the accessory provides a low voltage and low current, e.g., 0.3 V and 15 mA or less, on a power contact of the plug connector. At block 706, an identification module in the accessory detects a change in state of a communication line (e.g., the ID bus line) between the host device and the accessory. For example, the communication line may change from a logic 'low' state to a logic 'high' state. In response to the change in the state of the communication line, the identification module of the accessory sends a command to a power control circuitry to enable a current limited mode of the power control circuitry at block 708. The current limited mode may provide the same low current as above but at a higher voltage, e.g., 5 V-30 V. Thereafter, the host device may authenticate the accessory at block 710. Once the authentication is completed successfully, the identification module may send another command to the power control circuitry to enable the current unlimited mode at block 712. In the current unlimited mode, the accessory can supply a higher current, e.g., up to 5 Amps, at up to 30 V.

It should be appreciated that the specific steps illustrated in FIG. 7 provides a particular method of monitoring contacts in a connector according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

In embodiments where the host device does not have its own power at start-up, e.g., the host battery is dead, the host device cannot change the state of the communication line from a logic 'low' to logic 'high'. Thus, in this scenario the plug connector may not be able to detect presence of the host device based on change of state of the communication line. However, the plug connector still may have to detect presence of the host device before the accessory can enable the current unlimited mode for the power control circuitry. In such a dead battery scenario, in one embodiment, when the plug connector is mated with the receptacle connector of the host device, the accessory can measure the impedance on the communication line (i.e. ID bus line). If a host device is present, the accessory can detect a specific value of impedance on the ID bus line, e.g., between 1 MΩ and 5 MΩ. In a particular embodiment, the impedance value is about 2 MΩ. Once the accessory detects the appropriate impedance value, it concludes that the plug connector is connected to a host device and based on that the accessory can enable the current limited mode of the power control circuitry. The low current supplied by the accessory can then be used by the host to perform accessory authentication as described above. Once the accessory authentication is successfully completed, the accessory can enable the current unlimited mode and thus provide enough current for the host to start charging its battery.

Figure 8:
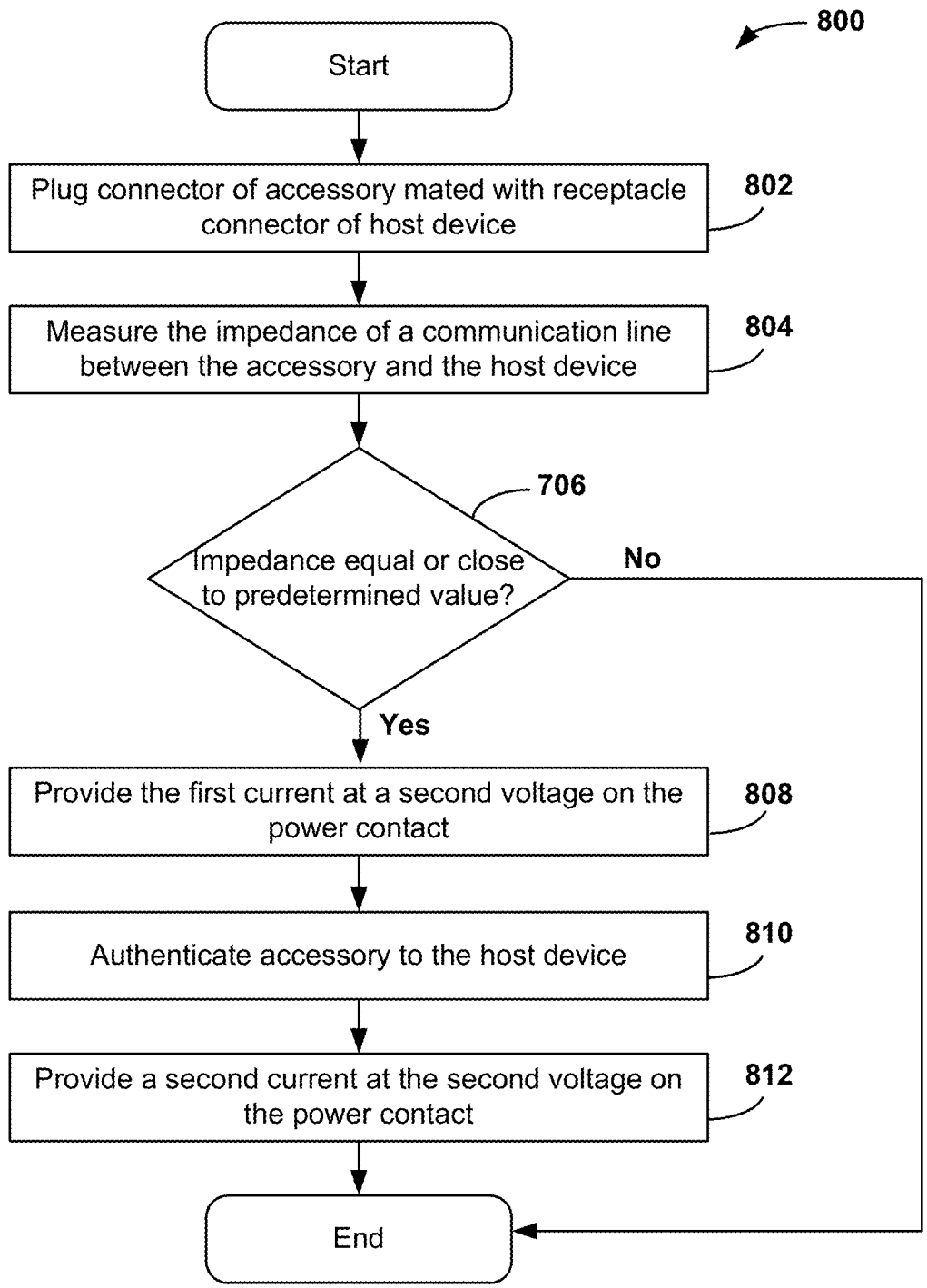
FIG. 8 is a flow chart of a process tier operating an accessory according to an embodiment of the present invention.

FIG. 8 is a flow chart of a process 800 for operating an accessory according to an embodiment of the present invention. Process 800 can be performed, e.g., by accessory 604 of FIG. 6. In this embodiment, it is assumed that the host device does not have any power (e.g., host device has a dead battery).

At block 802, the accessory plug connector is mated with a receptacle connector of the host device. At time to mating the accessory provided a low voltage bias (e.g., 0.3 V or less) and a low current (e.g., 15 mA or less) at a power contact of the plug connector. At block 804, the accessory measures the impedance on a communication line between the accessory and the host device. At block 806, the accessory determines whether the measured impedance is equal or close to a predetermined value. If the measured impedance is equal to or substantially equal to the predetermined value (within a tolerance range) then the accessory can conclude that the plug connector is connected to a host device. As described above, the predetermined or reference impedance value when a host device connected to the accessory is between 1 MΩ and 5 MΩ. If the measured impedance is not equal to or substantially equal to the predetermined value, the accessory concludes that the plug connector is not attached to a host device and the process ends.

If at block 806, it is determined that the plug connector is mated with a corresponding receptacle connector of a host device, the accessory provides the low current but at a higher voltage (e.g., 5 V to 30 V) at the power contact of the plug connector, at block 808. The host device uses this low current/high voltage bias to boot itself. Thereafter, the host device may authenticate the accessory at block 810. Once the authentication is completed successfully, the accessory may provide a higher current at the higher voltage (e.g., up to 5 A, at up to 30 V) at the power contact of the plug connector at block 812. The host device can then use the provided current to charge its battery or otherwise use the power for its operation.

It should be appreciated that the specific steps illustrated in FIG. 8 provides a particular method of monitoring contacts in a connector according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

The embodiments described above provided techniques for determining that a host device is indeed connected to the plug device before providing normal power on the power contact of the accessory plug connector. In addition, as described above, even the data contacts are vulnerable to dendrite formation as even the data contacts can have a bias on them. For example, for a USB connector, the differential data contacts have a bias of about 3-3.3 V, even if the USB connector is not plugged into a USB host. Presence of this bias voltage over a long duration may cause the data contacts in the connector to degrade over time. It would be desirable to isolate the data contacts and keep them in a floating state until it is confirmed that the plug connector is actually connected to a host device.

Referring back to FIG. 6, contacts B and C in plug connector 610 are data contacts. In some embodiments, each of the data contacts B and C can be connected to a power source via a multiplexer 616. Each contact B and C have a fixed bias that can be applied to them using the two voltage divider circuits formed using resistors R1, R2 and R3, R4. The values of these resistors can be chosen based on the value of the bias desired on contacts B and C and based on the value of the VBus source voltage. A voltage divider circuit and its operation is well-known in the art and hence is not elaborated here. In some embodiments, the voltage divider circuit can be internal to accessory 604. Moreover, it is to be noted that even tough multiplexer 616 is shown as being part of accessory connector 610; this is not needed. In some embodiments, multiplexer 616 can be part of accessory 604.

In operation, multiplexer 616 can work in conjunction with the identification module 614 and power control circuitry 612. In the default mode, the switches in multiplexer may be open thereby placing contacts B and C in a floating state in which there is no bias on either of the contacts. Once it is confirmed that the plug connector is connected to a host device, e.g., using any of the techniques described above, a signal may be sent to multiplexer 616 to close the switches thereby applying the bias generated by the voltage divider circuits to be applied to contacts B and C. Therefore, until the plug connector is actually mated with a host device, contacts B and C do not have a bias voltage. This helps in preventing and/or slowing down the dendrite growth at contacts B and C and increased the reliability of the contacts. In some embodiments, identification module 614 can send the signal to multiplexer 616 in order to activate the switches. For example, when identification module sends the signal to the power control circuitry to enable the current unlimited mode, concurrently the identification module may also send a signal to the multiplexer to close the switches. One skilled in the art will realize that this is only one exemplary way in which bias may be provided on contacts B and C and many other techniques may also be used.

Figure 9:
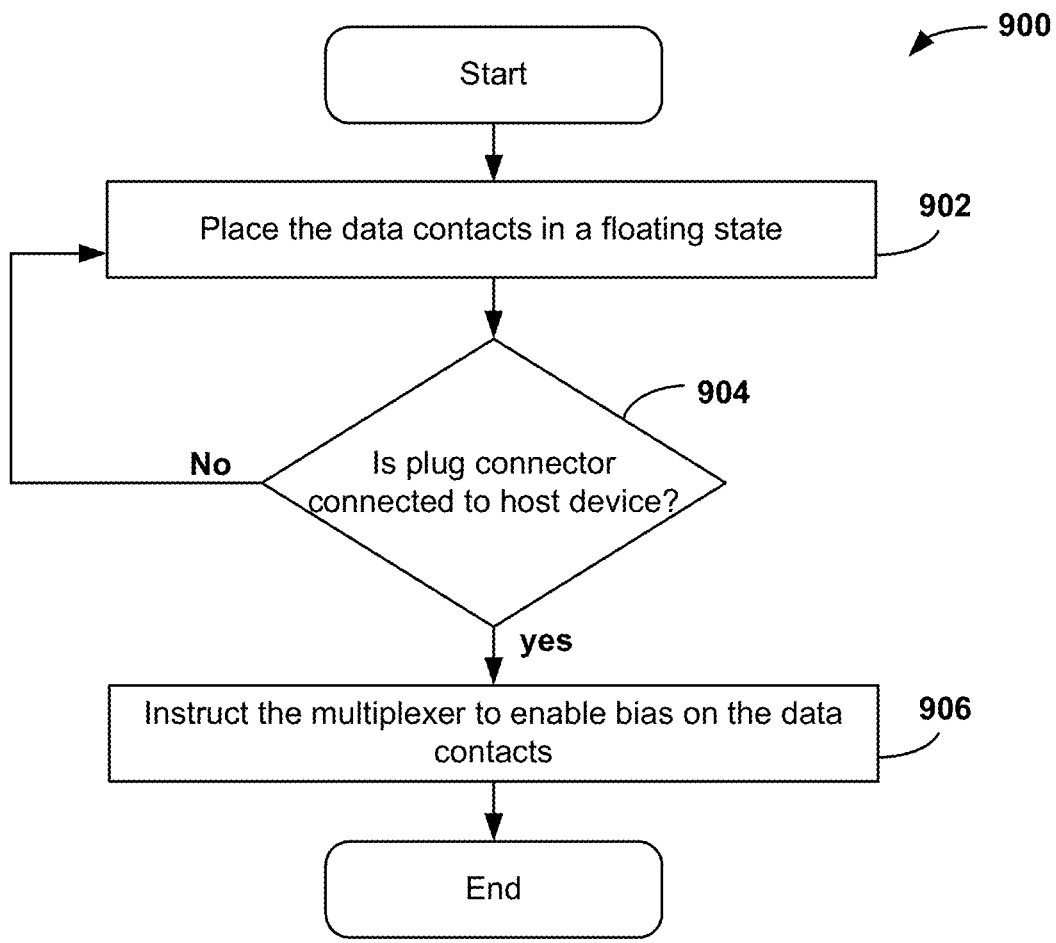
FIG. 9 is a flow chart for a process of operating an accessory device according to another embodiment of the present invention.

FIG. 9 is a flow chart for a process 900 of operating an accessory device according to an embodiment of the present invention. Process 900 can be performed, e.g., by accessory 604 of FIG. 6.

At block 902, the data contacts in the plug connector are placed in a floating state. In other words, there is no voltage on the data contacts. At block 904, the accessory can determine whether the plug connector is connected to a host device, e.g., using any of the techniques described above. If it is determined that the plug connector is not connected to a host device, the accessory can maintain the data contacts in a floating state. If at block 904, it is determined that the plug connector is connected to the host device, the accessory can signal the multiplexer to enable a voltage on the data contacts at block 906.

It should be appreciated that the specific steps illustrated in FIG. 9 provides a particular method of operating an accessory according to an embodiment of the present invention. Other sequences of steps may also be performed according to alternative embodiments. For example, alternative embodiments of the present invention may perform the steps outlined above in a different order. In some embodiments, the accessory may ensure that it has been authenticated by the host device prior to enabling the bias on the data contacts. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
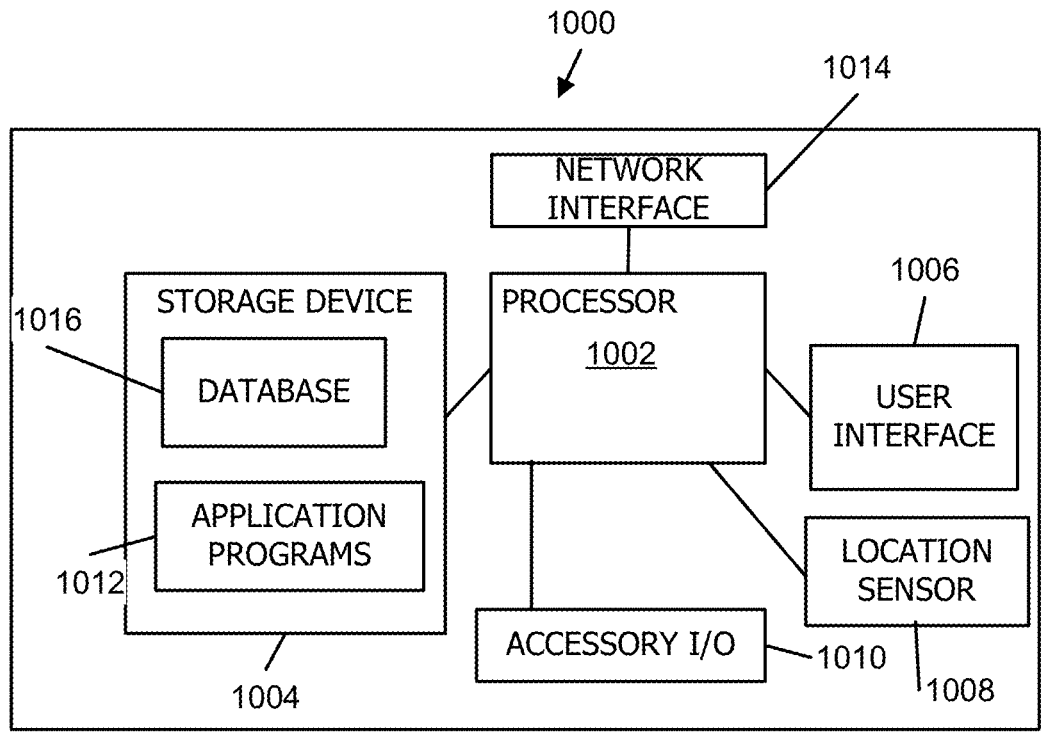
FIG. 10 is a functional block diagram of a host device according to an embodiment of the present invention.

FIG. 10 is a functional block diagram of a host device 1000 according to an embodiment of the present invention. Host device 1000 can include processor 1002, storage device 1004, user interface 1006, location sensor 1008, accessory input/output (I/O) interface 1010, and network interface 1014.

Processor 1002, which can be implemented as one or more integrated circuits (e.g., a single core or multi-core microprocessor(s) or microcontroller), can control the operation of host device 1000. For example, in response to information received from the accessory, processor 1002 in conjunction with other components can perform authentication of the accessory.

Storage device 1004 can be implemented, e.g., using disk, flash memory, or any other non-volatile storage medium. In some embodiments, storage device 1004 can store one or more application programs 1012. Each application program can provide functionality for performing one or more tasks. For example, an application program can provide word processing capability; another application may provide the ability to browse the Internet, etc. Storage device 1004 can also store other information such as information about a user's contacts (names, addresses, phone numbers, etc.); scheduled appointments and events; notes; and/or other personal information. In still other embodiments, storage device 1004 can store one or more programs to be executed by processor 1002 (e.g., video game programs, personal information management programs, etc.).

In some embodiments, storage device 1004 can include a database 1016. Database 1016 can store information related to one or more stores for faster access by host device 1000. In some embodiments, database 1016 can store information about one or more accessories/plug connectors that have been deemed unusable by the host device based on any of the techniques described above.

User interface 1006 can include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). A user can operate the various input controls of user interface 1006 to invoke the functionality of host device 1000 and can view and/or hear output from host device 1000 via user interface 1006.

Location sensor 1008 can be any component or combination of components that can detect the location of host device 1000 at any given time. In some embodiments, location sensor 1008 can include a global positioning satellite (GPS) receiver that can communicate with one or more positioning satellites in order to determine the location of host device 1000 at any given time. In some embodiments, location sensor 1008 can determine the location of host device 1000 using local Wi-Fi hotspots or using cellular phone triangulation technique.

Accessory I/O interface 1010 can allow host device 1000 to communicate with various accessories. For example, accessory I/O interface 1010 might support connections to a joystick, a remote control, or the like. In one embodiment, accessory I/O interface 1010 includes a 30-pin connector corresponding to the connector used on iPod® products manufactured and sold by Apple Inc. Alternatively or additionally, accessory I/O interface 1010 can include a different connector and/or wireless interface (e.g., Bluetooth or the like). In some embodiments, accessory I/O interface can include receptacle connector 406 of FIG. 4.

Network interface 1014 can allow host device 1000 to communicate with other devices on a network and exchange information with the other devices. For example, in some embodiments, network interface 1014 can be used to connect with an external database in order to get information about an accessory and/or a particular plug connector. In some embodiments network interface 1014 can include radio frequency (RE) transceiver components for accessing wireless voice and/or data networks (e.g., using cellular telephone technology, advanced data network technology such as 3G, 4G, LIE, or EDGE, Wi-Fi (IEEE 802.11 family standards), or other mobile communication technologies, or any combination thereof), GPS receiver components, and/or other components. In some embodiments network interface 1014 can provide wired network connectivity (e.g., Ethernet) in addition to or instead of a wireless interface. Network interface 1014 can be implemented using a combination of hardware antennas, modulators/demodulators, encoders/decoders, and other analog and/or digital signal processing circuits) and software components.

It will be appreciated that the system configurations and components described herein are illustrative and that variations and modifications are possible. The host device can have other capabilities not specifically described herein. Further, while the host device is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Figure 11:
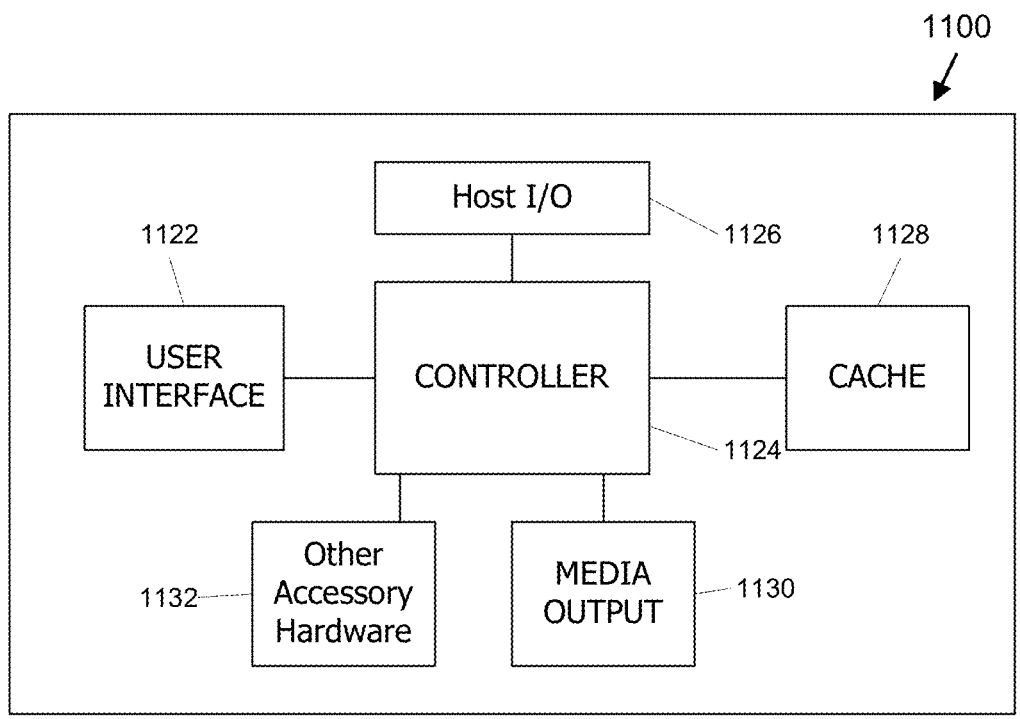
FIG. 11 is a functional block diagram of an accessory according to an embodiment of the present invention.

FIG. 11 is a functional block diagram of an accessory 1100 according to an embodiment of the present invention.

Accessory 1120 includes controller 1124, user interface 1122, host I/O interface 1126, cache 1128, other accessory hardware 1132, and media output device 1130. Controller 1124 can include, e.g., a microprocessor or microcontroller executing program code to perform various functions such as digital audio decoding, analog or digital audio and/or video processing, and the like. User interface 1122 can include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). Alternatively, output components of user interface 1122 can be integrated with media output device 1130. A user can operate the various input controls of user interface 1122 to invoke the functionality of accessory 1120 and can view and/or hear output from accessory 1120 via user interface 1122. In some embodiments, user interface 1222 can be located remote to the accessory. For instance, user interface 1222 can be implemented in a remote control device (not shown) that is communicably coupled to accessory 1220 and that can be used to control the various functions performed by accessory 1220.

Host I/O interface 1226 can allow accessory 1220 to communicate with host device. In some embodiments, host I/O interface 1226 may include plug connector 610. Cache 1228, which can be implemented using volatile and/or nonvolatile memory, provides storage for various information including information obtained from the host device.

Media output device 1130, which can be implemented, e.g., as one or more integrated circuits, provides the capability to output various types of media. For example, media output device 1130 can include a display screen or a driver circuit and connector for an external display screen, thereby enabling video and/or still images to be presented to a user. Additionally or instead, media output device 1130 can also include one or more speakers or driver circuits and connectors for external speakers, thereby enabling audio to be presented to a user.

Other accessory hardware 1132 can include the power control circuitry, the identification module, etc. as described above. In addition, accessory 1100 may include additional hardware not specifically described herein.

It will be appreciated that the system configurations and components described herein are illustrative and that variations and modifications are possible. The accessory can have other capabilities not specifically described herein.

Further, while the accessory is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Figure 12:
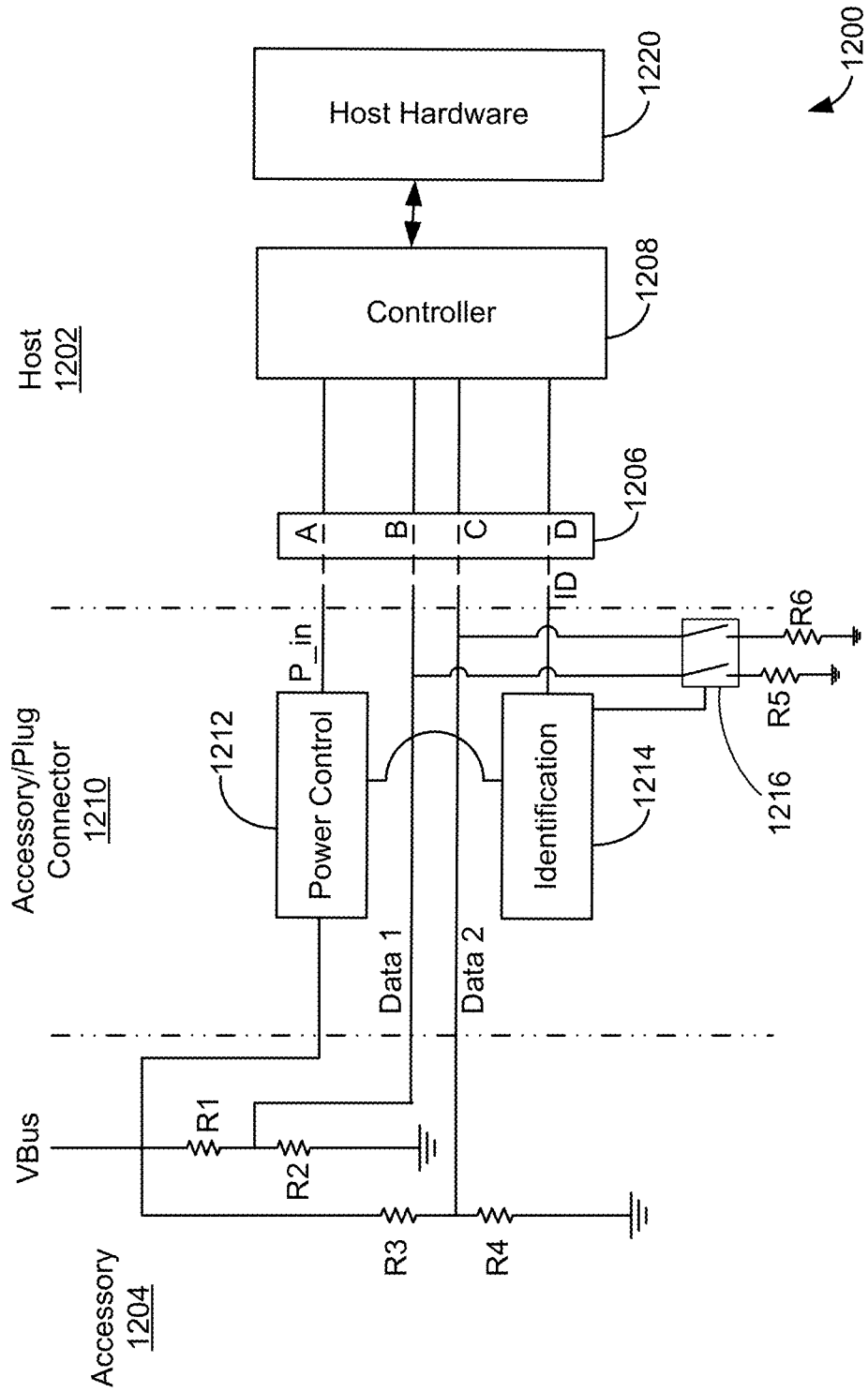
FIG. 12 is a block diagram for a system for monitoring contacts of a connector according to another embodiment of the present invention.

FIG. 12 is a high-level block diagram of a system for preventing dendrite growth on connector contacts according to another embodiment of the present invention. Accessory 1204, connector 1210, host 1202, power control module 1212, identification module 1214, host connector 1206, controller 1208, host hardware 1220, and R1-R4 have similar functions as their corresponding components described in reference to FIG. 6 above. The description of these components is not repeated herein for sake of brevity.

As illustrated in FIG. 12, accessory connector 1210 includes switches 1216 that are connected to the data contacts of accessory 1204. Switchbox 1216 can either include a single switch controlling the electrical path between contacts Data 1 and Data 2 and ground or may include two individual switches (as shown) each controlling the electrical path of Data 1 and Data 2, respectively. Each of the switches is coupled to a resistor R5 and R6, respectively. The value of R5 and R6 may range between 1 kΩ and 3 kΩ. Switchbox 1216 may be controlled via a signal from identification module 1214.

In an embodiment, accessory 1204 may provide power to host device 1202. The power may be provided over the P_in contact. Accessory identification and/or authorization by host device 11202 may be conducted over the ID contact that is coupled to identification module 1214. In normal operation, once connector 1210 of accessory 1204 is connected to connector 1206 of host device 1202, the host device may send identification and/or authentication commands to the accessory over the ID contact. Once the authentication process is completed, identification module 1214 sends a signal to power control module 1212 to enable power to be supplied to the host device. In response, power control module 1212 enters a low resistance mode and facilitates the VBus voltage to be supplied to the host device over the P_in contact.

However in some instances, plug connector 1210 may not be connected to the host device or may get disconnected from the host device during normal operation. In such situations, it would be desirable to reduce/eliminate the voltage on the P_in contact so as to prevent growth of dendrites over the exposed contacts of plug connector 1210. Also if any other contaminants such as water or metal debris were to deposit on the contacts, it might result in a short thereby damaging the connector. FIG. 13 illustrates a table that shows the behavior of the system in several scenarios whereby voltage on the P_in contact is reduced/eliminated. The following description refers to both FIG. 12 and the table in FIG. 13.

In a first instance when the plug connector of the accessory is not connected to the host device, the identification module does not detect presence of a host device. This is indicated as "OFF" in the first row of the table under the 'ID' column. In addition, if there is no voltage being provided by the accessory, i.e., VBus=0V, indicated as "OFF" in the N/Bus column, then the two switches are in an 'open' state. In this instance, there is no voltage on the P_in contact of the plug connector and thus there is no threat of growth of dendrites or of an inadvertent short occurring.

A second instance may occur when the plug connector is not connected to the host device (indicated as 'OFF' in the table) but the accessory outputs a voltage, e.g., 5V, over the P_in contact (indicated as 'ON' in the table). This instance has the most probability of dendrite growth due to the presence of voltage on a contact and the voltage not being used to provide current to any device. In this instance, the identification module will determine that no host is present and send a signal to the two switches to place them in a 'closed' state. When the switches are closed, any available voltage (e.g., VBus) passes via the two sets of resistors (R1, R2, R5 and R2, R3, R6) via the two data contacts and is coupled to the ground. Therefore to no voltage is available at the P_in contact. Even if there is some voltage available at the P_in contact, it is not enough to cause any serious problems.

A third instance may occur when a host may be connected to the plug connector (ID=ON) but there is no VBus voltage available (VBus=OFF). In this instance, the identification module commands the two switches to be in the 'open' state. Since there is no voltage available on the P_in contact, there is no danger any dendrite growth. A fourth instance may occur when the host is connected to the plug connector (ID=ON) and VBus voltage is available to power the host (VBus=ON). In this instance, the two switches are placed in the open state to make the VBus available over the P_in contact to provide power to the host. This can be considered as the normal operating state of the system.

Figure 14:
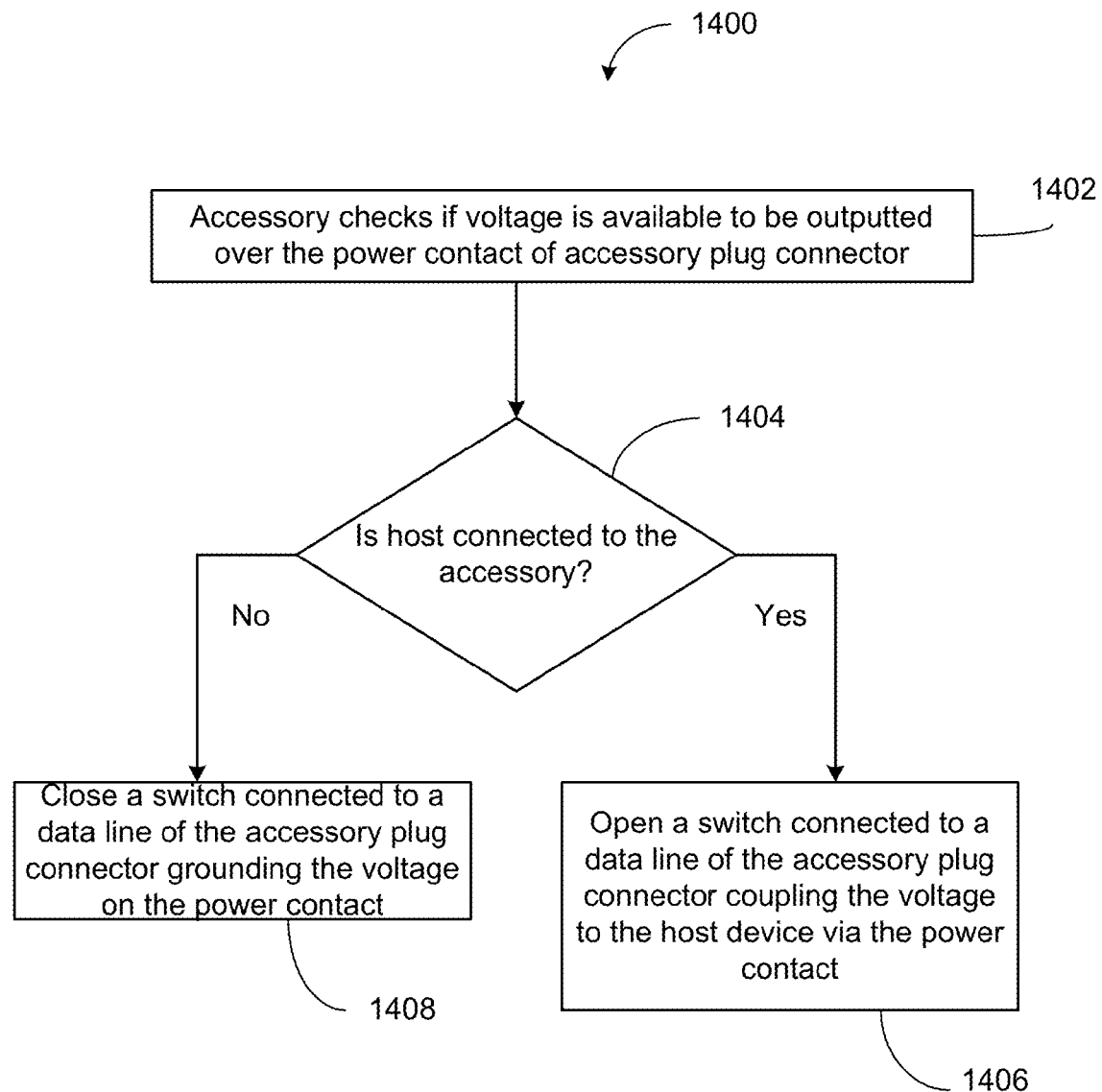
FIG. 14 is a flow diagram of a process of operating an accessory according to an embodiment of the present invention.

FIG. 14 is a flow diagram of a process 1400 for operating a system according to an embodiment of the present invention. Process 1400 may be performed, e.g., by accessory 1204 of FIG. 12. At step 1402, the accessory may check whether a voltage is available to be outputted over the power contact of the accessory connector. At step 1404 the accessory may determine whether a host has been connected to it. If the accessory determines that a host is connected, the identification module in the accessory may cause a switch connected to a data line of the accessory connector to be opened at step 1406 thereby providing power to the host device over the power contact. If at step 1404, the accessory determines that the host device is not connected, the identification module in the accessory connector may cause the switch to be closed at step 1408 thereby grounding the available voltage and preventing the voltage to be available on the power contact.

It should be appreciated that the specific steps illustrated in FIG. 14 provides a particular method of operating a system according to an embodiment of the present invention. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 15:
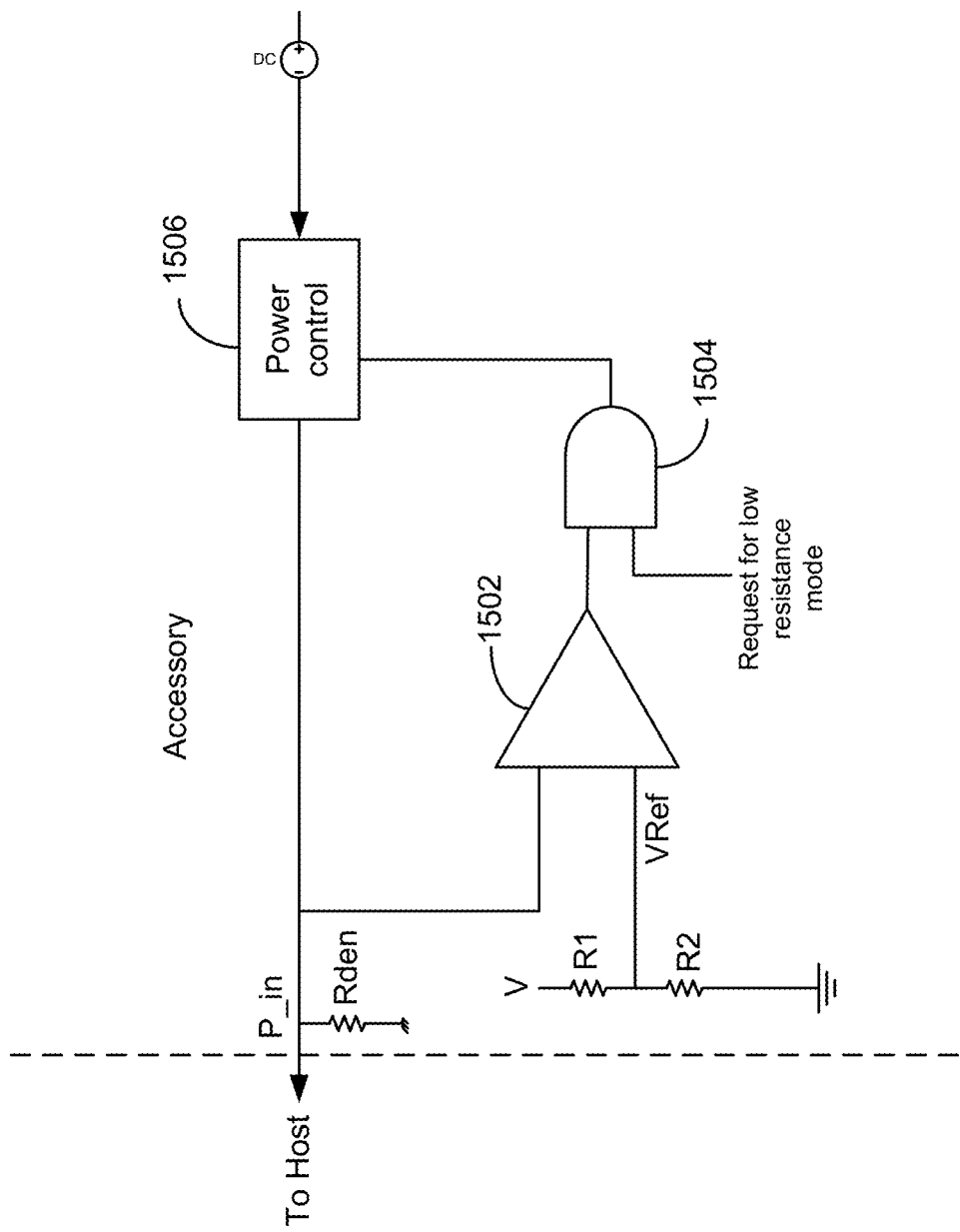
FIG. 15 is a high-level circuit diagram for monitoring a power contact according to an embodiment of the present invention.

In some embodiments, it may be desirable to prevent the full voltage to appear on the P_in contact even if the identification module sends a signal to the power control module to enter the low resistance mode and enable the available power to appear on the P_in contact. FIG. 15 illustrates a circuit for monitoring the power contact of an accessory connector according to an embodiment of the present invention. For example, there may be dendrite growth on the P_in contact and the accessory plug connector may be connected to a host device. In this instance the identification module will detect the present of the host device and instruct power control module 1406 to enable the low resistance mode (i.e., current unlimited mode described above) thereby supplying all available power at the P_in contact. However, dendrites, illustrated as 'Rden' in FIG. 15, may cause a voltage drop across and as a result there may be less voltage available at the P_in contact for charging the host device. For example, the voltage available for charging may be about 5V; however due to the dendrite growth at the P_in contact, the actual voltage available at the P_in contact may only be 1V. In such a situation, the actual available voltage may not be enough to charge/provide power to the host device. In this situation, the host device may try to pull the predetermined amount of current from the power supply and this may result in a brown-out situation since the voltage at the P_in contact of the accessory is not enough to support the amount of current requested by the host device.

The circuit illustrated in FIG. 15 can detect presence of such dendrite growth and prevent power control module 1506 from enabling the low-resistance mode. The circuit continuously monitors the voltage at the P_in contact and compares that voltage to a reference voltage, VRef. VRef can be adjusted based on expected voltage at the P_in contact in case of dendrite growth. In some embodiments, VRef can be calculated by experimenting with growing different amounts of dendrites on the P_in contact and then measuring the actual voltage at the P_in contact when a known voltage is provided to the power control module. The output of comparator 1502 is fed to an AND gate 1504. The other input of gate 1504 is the signal from the identification module that instructs power control module 1506 to enable the low resistance mode. Consider that there is dendrite growth on the power contact P_in and power control module is providing all available voltage at the P_in contact in a current-limited mode. If the total available voltage output from the DC source is 5V, then only a fraction of that voltage will actually be measured at the P_in contact since most of the voltage will appear across the dendrites, i.e., Rden. If the actual measured voltage at the P_in contact is 1V, this voltage is compared by comparator 1502 with the VRef (which in this example may be about 2.5 V). The output of comparator 1502 is fed to AND gate 1504. Therefore, in this case, voltage at P_in<VRef. If the gate 1504 now receives a signal to enable the low resistance mode of power control module 1506 to allow the host device to draw maximum current from the power supply, it will not send that signal to the power control module. Thus, the power control module will remain in/enter its default current-limited mode and not enter the low resistance mode. In this manner, the accessory can detect and prevent against dendrite growth on the contacts of the plug connector. Until the dendrites are cleared, i.e., Rden is eliminated, the power control module may not enable the low resistance mode.

Figure 16:
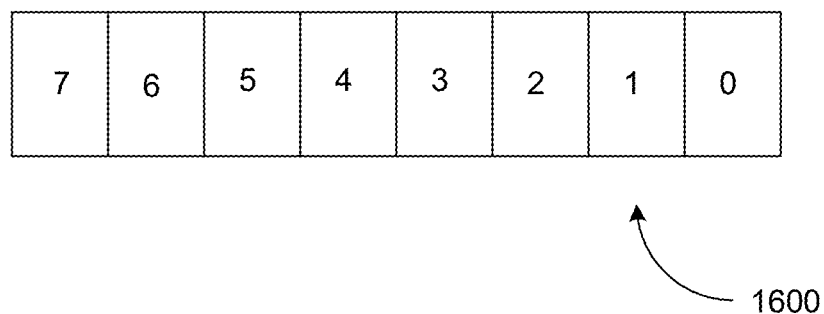
FIG. 16 illustrates a power status register according to an embodiment of the present invention.

In a normal operating condition, if voltage at P_in>VRef and the low resistance signal is received by gate 1504, a corresponding signal is sent to power control module 1506 to enable the low resistance mode. In some embodiments, it may be possible to determine why the power control module cannot enable the low resistance mode even after receiving a signal from the identification module. In a particular embodiment, the accessory may include a power status register. FIG. 16 illustrates a power status register 1600 according to an embodiment of the present invention.

Each of the bits 0-7 can have two states '0' and '1'. In an embodiment, bit#7 may provide over-voltage protection status. A '0' may represent that the over voltage protection has not been triggered and a '1' may indicate the voltage input to the power control module is greater than a threshold voltage. In this instance the power control module may not enable the low-resistance mode. This bit may be not reset until the accessory is power-cycled. In an embodiment, bit#5 may indicate the over-current protection status. A '0' may indicate that over-current protection is not triggered and a '1' may indicate that an over-current event has occurred. In an embodiment, bit#4 may indicate whether the power control module cannot enable the low resistance mode due to presence of dendrites on the accessory plug connector. A '0' may indicate that there is no issue with dendrites while a '1' may indicate that the power control module cannot enable the low resistance mode possibly due to some pre-existing load (i.e. dendrites) on the power contact of the plug connector. The host device and/or the accessory can read the power status register to determine the cause of power failure on the P_in contact. Other bits in power status register may be used to indicate over-temperature failure, a test mode, and any other power failure status as needed.

Figure 17:
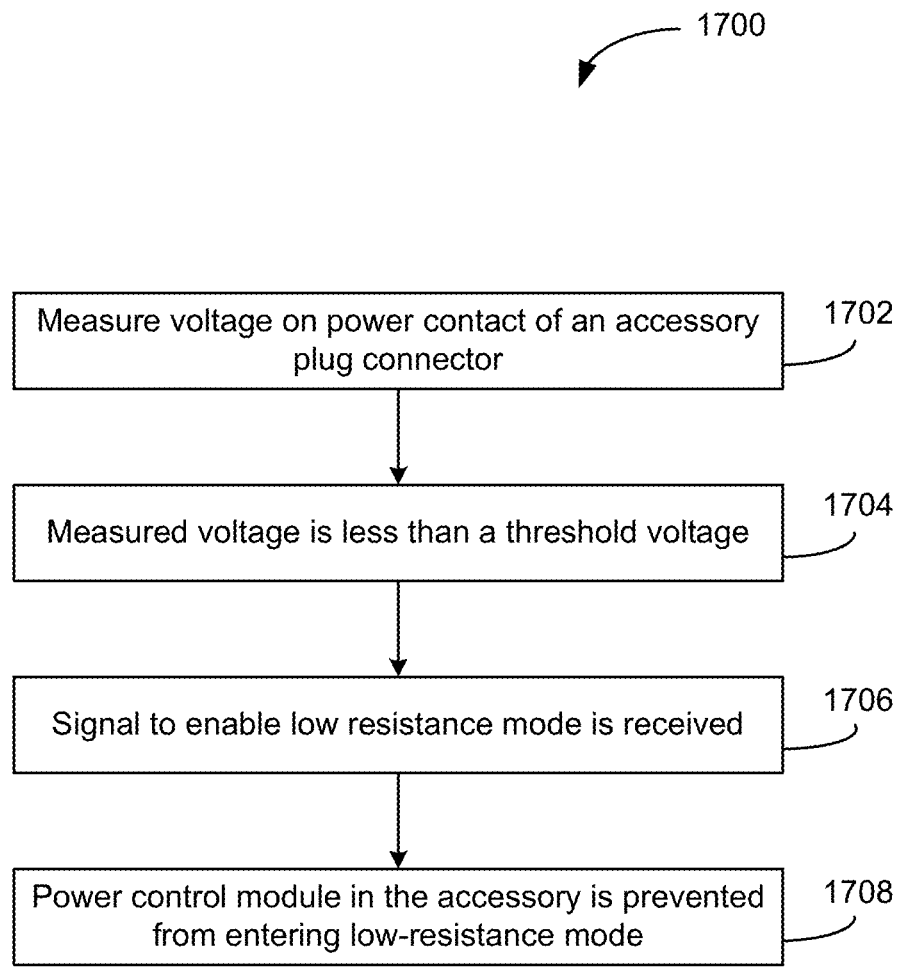
FIG. 17 is a flow diagram of process for operating an accessory according to another embodiment of the present invention.

FIG. 17 is a flow diagram of a process 1700 for monitoring presence of dendrites according to an embodiment of the present invention. Process 1700 can be performed by, e.g., accessory 1100 of FIG. 11. At step 1702, the actual voltage on a power contact of a plug connector is measured. At step 1704, the measured voltage is compared to a reference voltage and determined that the measured voltage is less than the threshold voltage. At step 1706, it is determined that a signal to enter a low resistance state is received. At step 1708 an error message may be generated and the power control module in the accessory is prevented from entering the low resistance.

Alternatively, if it is determined that measured voltage is higher than the threshold voltage and the signal to enter low resistance mode is received, the power control module is instructed to enter the low resistance mode.

It should be appreciated that the specific steps illustrated in FIG. 17 provides a particular method of operating a system according to an embodiment of the present invention. Other sequences of steps may also be performed according to alternative embodiments. For example, alternative embodiments of the present invention may perform the steps outlined above in a different order. Moreover, the individual steps illustrated in FIG. 17 may include multiple sub-steps that may be performed in various sequences as appropriate to the individual step. Furthermore, additional steps may be added or removed depending on the particular applications. One of ordinary skill in the art would recognize many variations, modifications, and alternatives.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible electronic device, or the program code may be provided separately from electronic devices (e.g., via Internet download).

Thus, although the invention has been described with respect to specific embodiments, it will be appreciated that the invention is intended to cover all modifications and equivalents within the scope of the following claims.

What is claimed is:

1. An accessory configured to charge a host device, the accessory comprising:
   a connector having a plurality of contacts, wherein the plurality of contacts includes at least one power contact and at least one data contact and wherein the connector is configured to couple the accessory to a host device; and
   power control circuitry coupled to the connector, the power control circuitry providing first, second and third modes of operation that determine current and voltage provided to the power contact, wherein in the first mode of operation current provided to the power contact is limited to a first current level and voltage at the power contact is limited to a first voltage level, in the second mode of operation current provided to the power contact is limited to the first current level and voltage at the power contact is increased from the first voltage level to a second voltage level, and in the third mode of operation, current provided to the power contact is increased from the first current level to a second current level while voltage at the power contact is maintained at or above the second voltage level to charge the host device;

wherein the power control circuitry is configured to operate in the first mode of operation upon start-up of the accessory, switch to the second mode of operation when the accessory is connected to a host device by the connector, and switch to the third mode of operation upon successful authentication of the accessory by the host device.

2. The accessory of claim 1 wherein the second current is more than two orders of magnitude higher than the first current.

3. The accessory of claim 1 wherein the second voltage is an order of magnitude or more than the first voltage.

4. The accessory of claim 1 wherein the first current is in the range of 15 mA or less and the second current is in the range of 3 A to 5 A.

5. The accessory of claim 1 wherein the accessory detects a connection to the host device by detecting a change in state of a communication line between the accessory and the host device via the data contact.

6. The accessory of claim 1 further comprising authentication circuitry configured to:
receive a request from the host device to provide authentication information for the accessory;
send the authentication information to the host device based on the request; and
upon successful authentication of the accessory by the host, send a command to the power control circuitry to enable the third mode of operation.

7. The accessory of claim 1 wherein the accessory detects a connection to the host device by:
measuring an impedance of the communication line using the data contact; and
determining whether the measured impedance is substantially similar to an expected impedance value.

8. The accessory of claim 7 wherein the expected impedance value is between 1 MΩ and 5 MΩ.

9. The accessory of claim 7 wherein the first voltage has a value of 0.5 V or lower.

10. The accessory of claim 7 wherein the first current has a value of 15 mA or lower.

11. The accessory of claim 7 wherein the second voltage is between 3 V and 30 V.

12. The accessory of claim 1 wherein the plurality of contacts includes at least first and second data contacts, and wherein the accessory further comprises a switch operatively coupled to the first and second data contacts, the switch configured to place the first and second data contacts in a floating state in which there is no bias on either data contact when the accessory is not connected to a host device by the connector and configured to connect the first and second data contacts to a voltage source when the accessory is connected to a host device by the connector.

13. A method for operating an accessory having first, second and third modes of operation that determine current and voltage provided to a power contact in a connector including a plurality of contacts, configured to couple the accessory to a host device, the method comprising:
operating the accessory in the first mode of operation upon start-up of the accessory by limiting current provided to the power contacts to a first current level at a first voltage level;
switching the accessory to the second mode of operation when the accessory is connected to the host device by the connector,
wherein in the second mode of operation current provided to the power contact is limited to the first current level and voltage at the power contact is increased to a second voltage; and
switching to the third mode of operation to charge the host device upon successful authentication of the accessory to the host device, wherein in the third mode of operation current is provided to the power contact is increased to a second current level while voltage at the power contact is maintained at or above the second voltage level.

14. The method of claim 13 wherein the first current is about 15 mA or less and the second current is in the range of 3 to 5 Amps.

15. The method of claim 13 wherein the second current is more than two orders of magnitude more than the first current.

16. The method of claim 13 wherein the accessory detects a connection to the host device by detecting a change in state of a communication line between the accessory and the host device via a data contact.

17. The method of claim 13 further comprising:
receiving a request from the host device to provide authentication information for the accessory;
sending, by the accessory, the authentication information to the host device; and
upon successful authentication of the accessory by the host device, enabling the third mode of operation.

18. The method of claim 17 wherein the reference impedance value is in the range of 1 MΩ to 5 MΩ.

19. The method of claim 17 wherein the first current is lower than the second current and the first voltage is lower than the second voltage.

20. The method of claim 13 wherein the accessory detects a connection to the host device by measuring an impedance of the communication line over a data contact, and determining whether the measured impedance is substantially similar to an expected impedance value.

21. The method of claim 13 wherein the plurality of contacts includes at least first and second data contacts, and wherein the method further comprises placing the first and second data contacts in a floating state in which there is no bias on either data contact when the accessory is not connected to a host device by the connector and applying a bias voltage to the first and second data contacts when the accessory is connected to a host device by the connector.

* * * * *